US010377253B2

(12) United States Patent
Lee

(10) Patent No.: US 10,377,253 B2
(45) Date of Patent: Aug. 13, 2019

(54) AUTOMATED MECHANICAL PARKING STRUCTURE WITH ELECTRIC VEHICLE CHARGING DEVICE

(71) Applicant: Chang Yup Lee, Los Angeles, CA (US)

(72) Inventor: Chang Yup Lee, Los Angeles, CA (US)

( * ) Notice: Subject to any disclaimer, the term of this patent is extended or adjusted under 35 U.S.C. 154(b) by 158 days.

(21) Appl. No.: 15/655,862

(22) Filed: Jul. 20, 2017

(65) Prior Publication Data

US 2018/0118043 A1  May 3, 2018

Related U.S. Application Data

(60) Provisional application No. 62/414,675, filed on Oct. 29, 2016.

(51) Int. Cl.
*B60L 53/16* (2019.01)
*B60L 11/18* (2006.01)
(Continued)

(52) U.S. Cl.
CPC ......... *B60L 11/1818* (2013.01); *B60L 53/16* (2019.02); *B60L 53/18* (2019.02); *B60L 53/31* (2019.02);
(Continued)

(58) Field of Classification Search
CPC ... Y02T 10/7005; Y02T 90/14; Y02T 90/121; Y02T 10/7088; B60L 11/1818;
(Continued)

(56) References Cited

U.S. PATENT DOCUMENTS 5,612,606 A * 3/1997 Guimarin ................. B60K 1/04
320/109
5,812,070 A * 9/1998 Tagami ............... G07F 17/0042
340/457.4
(Continued)

FOREIGN PATENT DOCUMENTS

CN     203617749 U  *  5/2014
CN     104578344 A   *  4/2015
(Continued)

*Primary Examiner* — Helen Rossoshek
(74) *Attorney, Agent, or Firm* — Chanmin Park

(57) ABSTRACT

A mechanized parking structure includes a plurality of vehicle carrying pallets, a plurality of parking stalls in which the vehicle carrying pallets are stored and a plurality of electric charging devices. The electric charging device includes a pallet-side electric contact device and a stall-side electric contact device, which engages with the pallet-side electric contact device when the vehicle carrying pallet is stored in the parking stall whereby electric circuit is established. Multiple physical contacts are established between the pallet-side electric contact device and the stall-side electric contact device when the electric circuit is established. The electric contact device includes multiple contact segments and springs that are compressed by the contact segments. The physical contacts are established by the movement of the vehicle carrying pallet in to the parking stall and broken by the movement of the vehicle carrying pallet out of the parking stall.

7 Claims, 18 Drawing Sheets

(51) Int. Cl.
 *H01R 13/08*  (2006.01)
 *H01R 13/24*  (2006.01)
 *B60L 53/31*  (2019.01)
 *B60L 53/36*  (2019.01)
 *B60L 53/18*  (2019.01)

(52) U.S. Cl.
 CPC .............. *B60L 53/36* (2019.02); *H01R 13/08* (2013.01); *H01R 13/2478* (2013.01); *H01R 13/2421* (2013.01); *H01R 2201/26* (2013.01); *Y02T 10/7005* (2013.01); *Y02T 90/121* (2013.01)

(58) Field of Classification Search
 CPC .......... B60L 53/16; B60L 53/31; B60L 53/36; B60L 53/35; B60L 53/18; H02J 7/0042; H01R 13/2478; H01R 13/08; H01R 13/2421; H01R 2201/26
 See application file for complete search history.

(56) References Cited

U.S. PATENT DOCUMENTS

| | | | | |
|---|---|---|---|---|
| 5,850,135 | A * | 12/1998 | Kuki | H02J 7/0045 320/108 |
| 8,975,864 | B2 * | 3/2015 | Kim | B60L 11/182 320/109 |
| 9,209,648 | B2 * | 12/2015 | Wheatley | H02J 7/35 |
| 2006/0090858 | A1 * | 5/2006 | Heidenreich | E04F 10/0648 160/68 |
| 2010/0065344 | A1 * | 3/2010 | Collings, III | B60L 53/11 180/2.1 |
| 2011/0140658 | A1 * | 6/2011 | Outwater | B60L 53/36 320/109 |
| 2013/0096994 | A1 * | 4/2013 | Jakob | E04H 6/22 705/13 |
| 2013/0226345 | A1 * | 8/2013 | Zhao | B60S 5/06 700/258 |
| 2013/0229141 | A1 * | 9/2013 | Johnson | B60L 11/1824 320/101 |
| 2014/0042956 | A1 * | 2/2014 | Wheatley | H02J 7/35 320/101 |
| 2016/0375784 | A1 * | 12/2016 | Takatsu | E04H 6/245 320/108 |
| 2018/0118043 | A1 * | 5/2018 | Lee | B60L 11/1818 |
| 2019/0054832 | A1 * | 2/2019 | Lin | B60L 11/1833 |

FOREIGN PATENT DOCUMENTS

| | | | |
|---|---|---|---|
| CN | 105515111 | A * | 4/2016 |
| JP | 2012107447 | A * | 6/2012 |
| JP | 2013079556 | A * | 5/2013 |
| JP | 2014009517 | A * | 1/2014 |

* cited by examiner

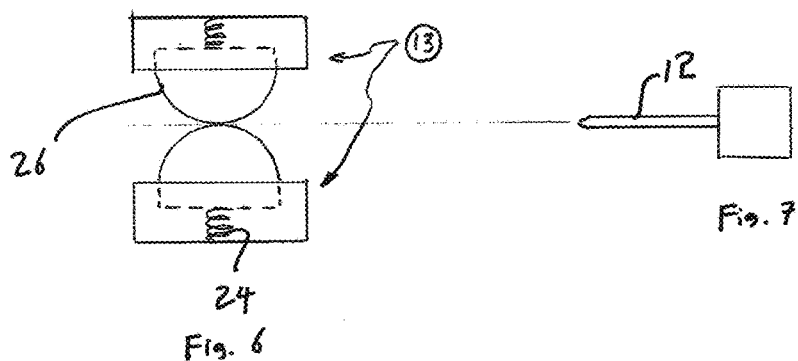
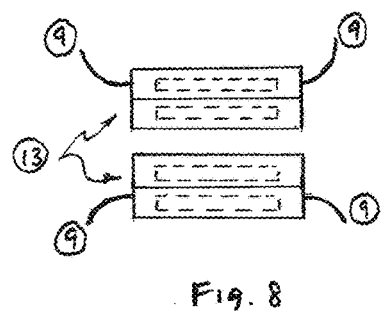
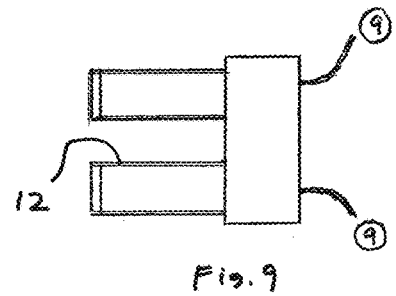
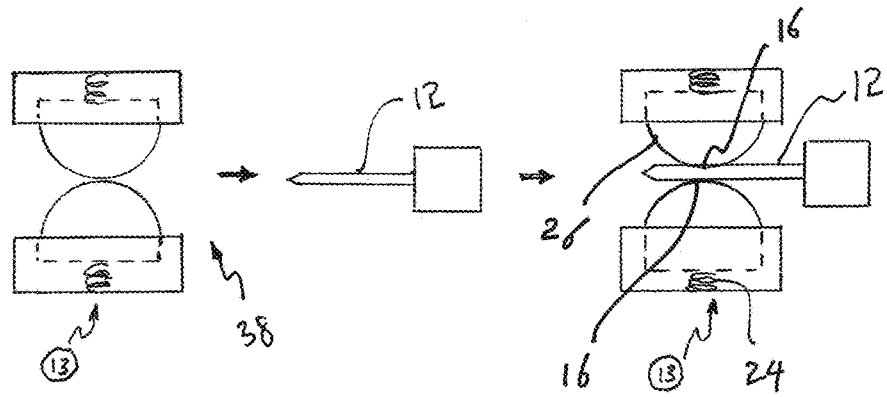

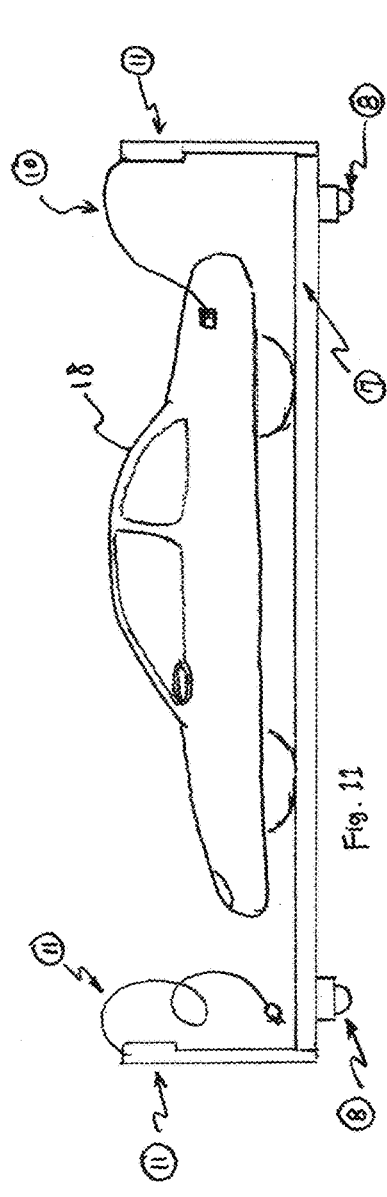
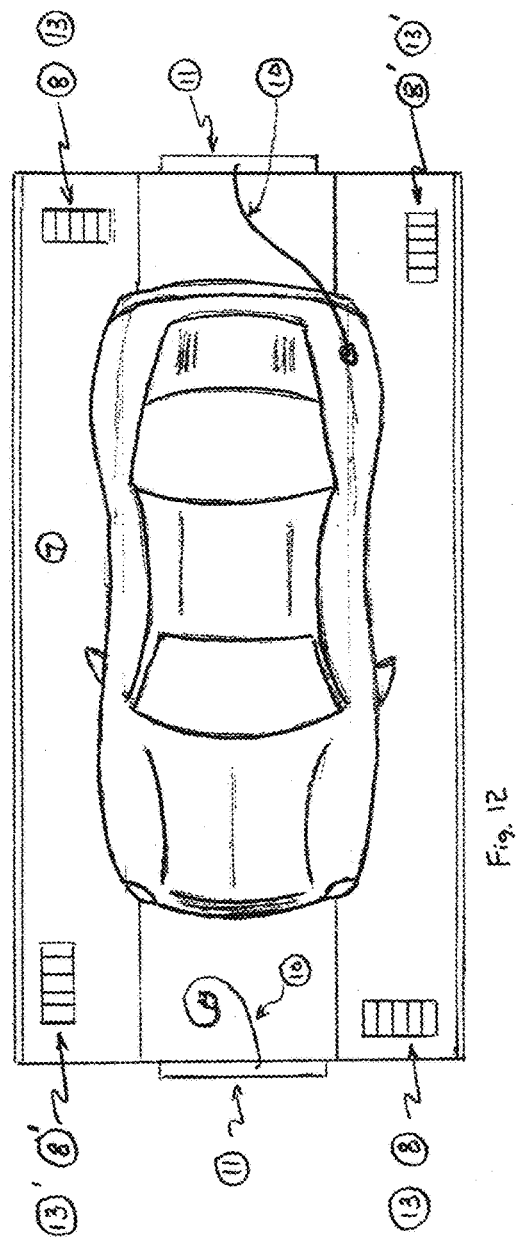
Fig. 11
Fig. 12

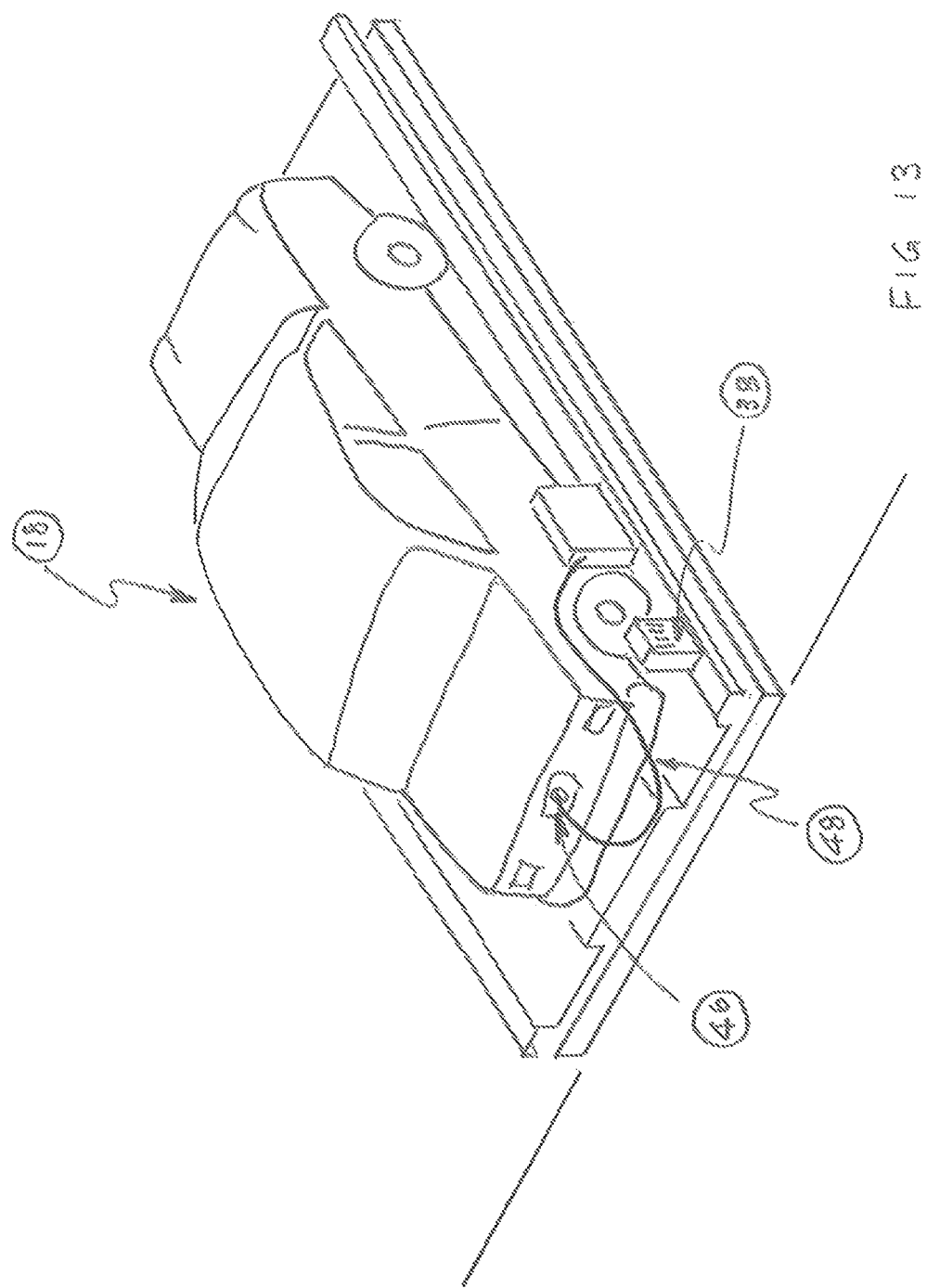

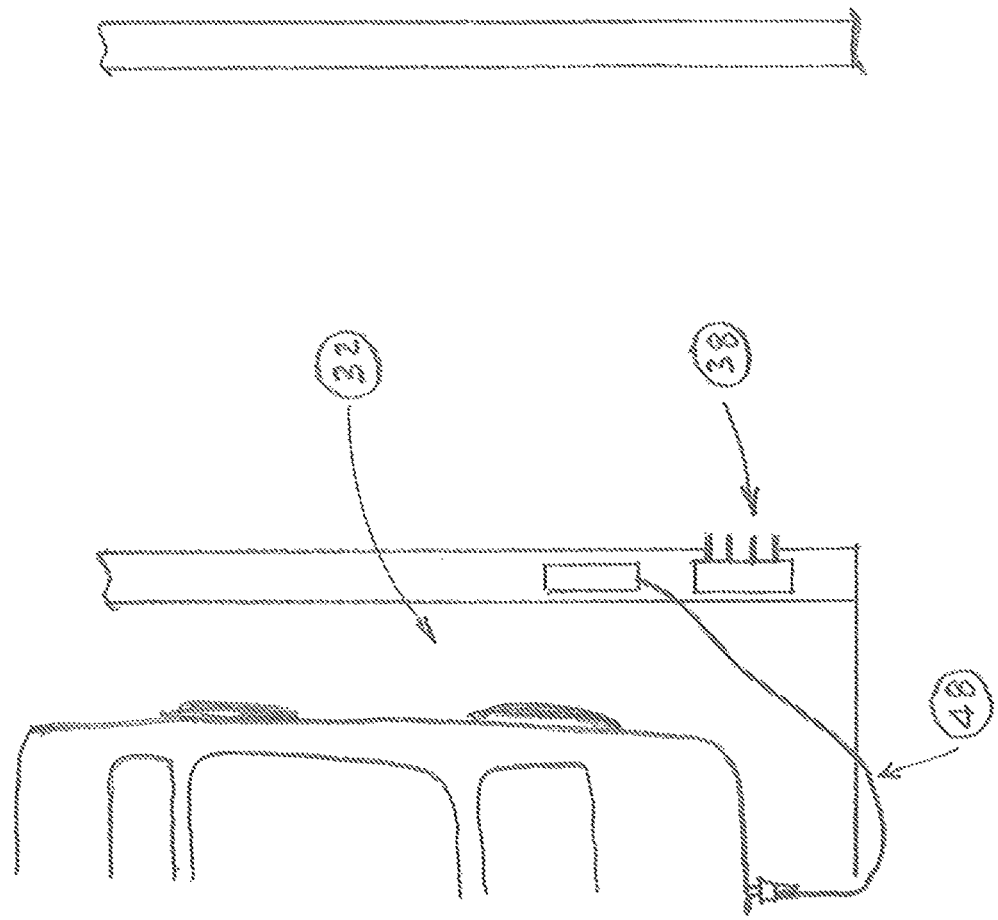

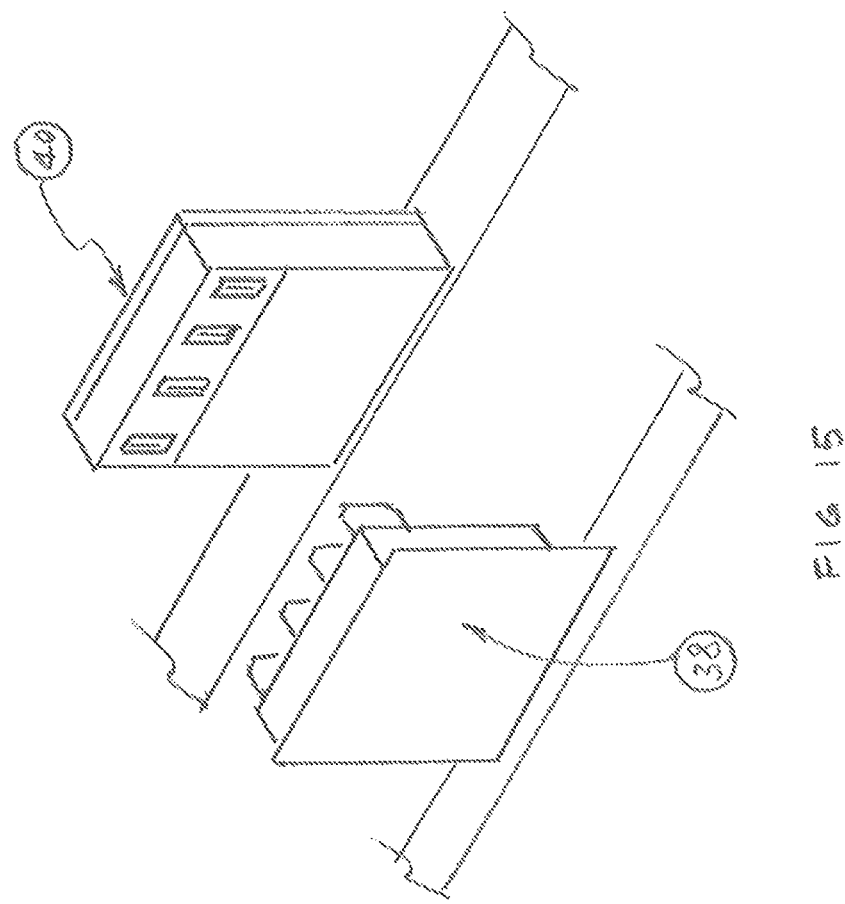
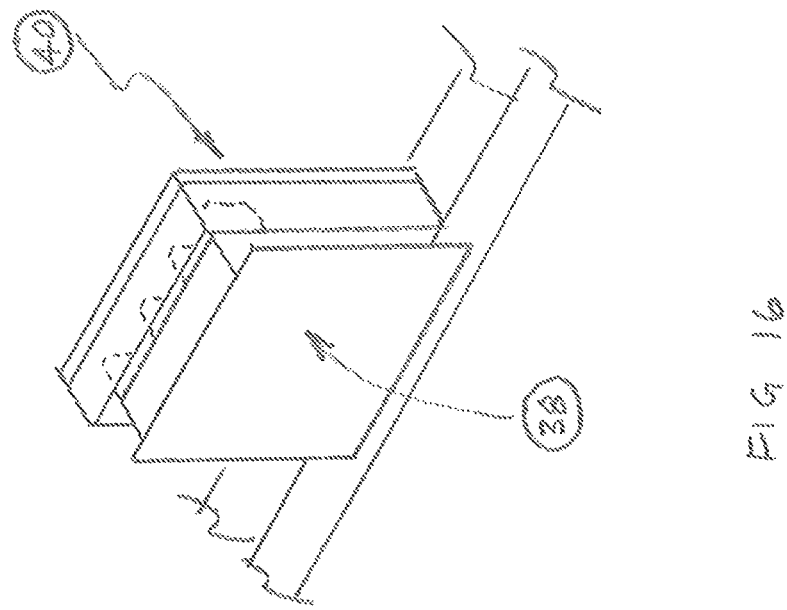

AUTOMATED MECHANICAL PARKING STRUCTURE WITH ELECTRIC VEHICLE CHARGING DEVICE

CROSS-REFERENCE TO RELATED APPLICATIONS

This application claims priority on the inventor's Provisional Application No. 62/414,675 filed on 29 Oct. 2016, the disclosure of which is incorporated by reference.

BACKGROUND OF THE INVENTION

1. Field of the invention

The present invention is related to an electric vehicle charging device for automated mechanical parking structure. More particularly, the present invention is related to a reliable and durable electric vehicle charging device that is integrated to the main shelving mechanism of an automated mechanical parking structure.

2. Discussion of Related Technology

As electric vehicles become popular, the need for charging facilities that are near to the routes of the electric vehicles is increasing. A parking lot in urban area is a natural choice for providing such facilities. Mechanized parking structures are also becoming popular in metropolitan area. Requirements for constructing and controlling the mechanized structure is complex, especially due to the limited space per car inside the structure. Electric vehicle Charging devices integrated into an automated mechanical parking structure has long been in need. The foregoing discussion in this section is to provide general background information, and does not constitute an admission of prior art.

SUMMARY OF THE INVENTION

An objective of the invention is to provide a mechanized parking structure into which electric vehicle charging facilities are integrated.

In order to achieve the objective, the present invention provides a mechanized parking structure comprises a plurality of vehicle carrying pallets, a plurality of parking stalls in which the vehicle carrying pallets are stored and a plurality of electric charging devices.

The electric charging device comprises a pallet-side electric contact device, a stall-side electric contact device, wherein the stall-side electric contact device engages with the pallet-side electric contact device when the vehicle carrying pallet is stored in the parking stall whereby electric circuit is established. At least part of the vehicle carrying pallets comprise the pallet-side electric contact device and at least part of the parking stalls comprise electric power supply that is connected to the stall-side electric contact device. A plurality of physical contacts are established between the pallet-side electric contact device and the stall-side electric contact device when the electric circuit is established.

The pallet-side electric contact device comprises a plurality of contact segments and a plurality of springs that are compressed by the contact segments; and/or the stall-side electric contact device comprises a plurality of contact segments and a plurality of springs that are compressed by the contact segments.

The physical contacts are established by the movement of the vehicle carrying pallet in to the parking stall and broken by the movement of the vehicle carrying pallet out of the parking stall.

The pallet-side electric contact device comprises a plurality of contact segments that correspond to the contact segments of the stall-side electric contact device, an electric plug that is adapted to be plugged into an electric vehicle, and an electric cord that electrically connects the electric plug and the contact segments. Tension is applied to the electric cord whereby the electric cord is secured over the vehicle carrying pallet.

The vehicle carrying pallet comprises a position guide and the parking stall comprises a position guide receiver with a tapered wall that receives the position guide whereby providing precise alignment of the contact segments of the pallet-side electric contact device and the contact segments of the stall-side electric contact device.

The pallet-side electric contact device is provided under the vehicle carrying pallet.

The pallet-side electric contact device is provided at the side of the vehicle carrying pallet.

The parking stall comprises structural beams, wherein the stall-side electric contact device is substantially positioned within the width of the structural beam.

The mechanized parking structure further comprises a controller that recognizes the type of a vehicle with an optical scanner and calculates the amount of electricity charged to the vehicle by measuring the amount of electricity flowing through the stall-side electric contact device.

The advantageous effects of the present invention are: (1) charging is reliable with the multiple spring-biased contact segments providing dimensional tolerance to the aligning mechanism between the electric contact devices; (2) supply and disconnection of charging electricity is safe and simple because the securing of the pallet itself inside the stall provides the switching function; (3) pallet and stall space requirements do not increase because the electric contact devices are provided in unused space of the structure; (4) charging of electric vehicles is efficient due to automatic recognition of vehicle type and accounting of consumed electricity are integrated into the functions of the mechanized parking structure.

BRIEF DESCRIPTION OF THE DRAWINGS

The accompanying drawings illustrate the best embodiments of the present invention. In the drawings:

FIG. 6 is a front elevation view showing electric contacts;

FIG. 7 is a front elevation view showing a buss bar;

FIG. 8 is a plan view of the electric contacts;

FIG. 9 is a plan vie of the buss bar;

FIG. 10 is a schematic diagram showing how electric contact is established in the second embodiment;

FIG. 11 is an elevation view of a vehicle carrying pallet equipped with the charging device;

FIG. 12 is a plan view of the pallet;

FIG. 13 is a perspective view showing a vehicle on the pallet;

FIG. 14 is a perspective view showing the pallet is moving toward the stall-side electric contact device;

FIG. 15 is an enlarged perspective view showing the pallet-side electric contact device and the stall-side electric contact device;

FIG. 16 is a perspective view showing the two contact devices in engaged state;

FIG. 31 is a perspective view showing that the vehicle arrived beside the stall destination;

DESCRIPTION OF PREFERRED EMBODIMENTS

Embodiments will be described in detail below. The accompanying drawings will be used for describing embodiments. For the sake of convenience of illustrating embodiments, thickness, length, diameter, size and other dimensions of components and/or hair would be illustrated or exaggerated to be different with those of actual components and/or hair, and the subject matter of this application is not limited to the illustrated embodiments.

Figure 1:
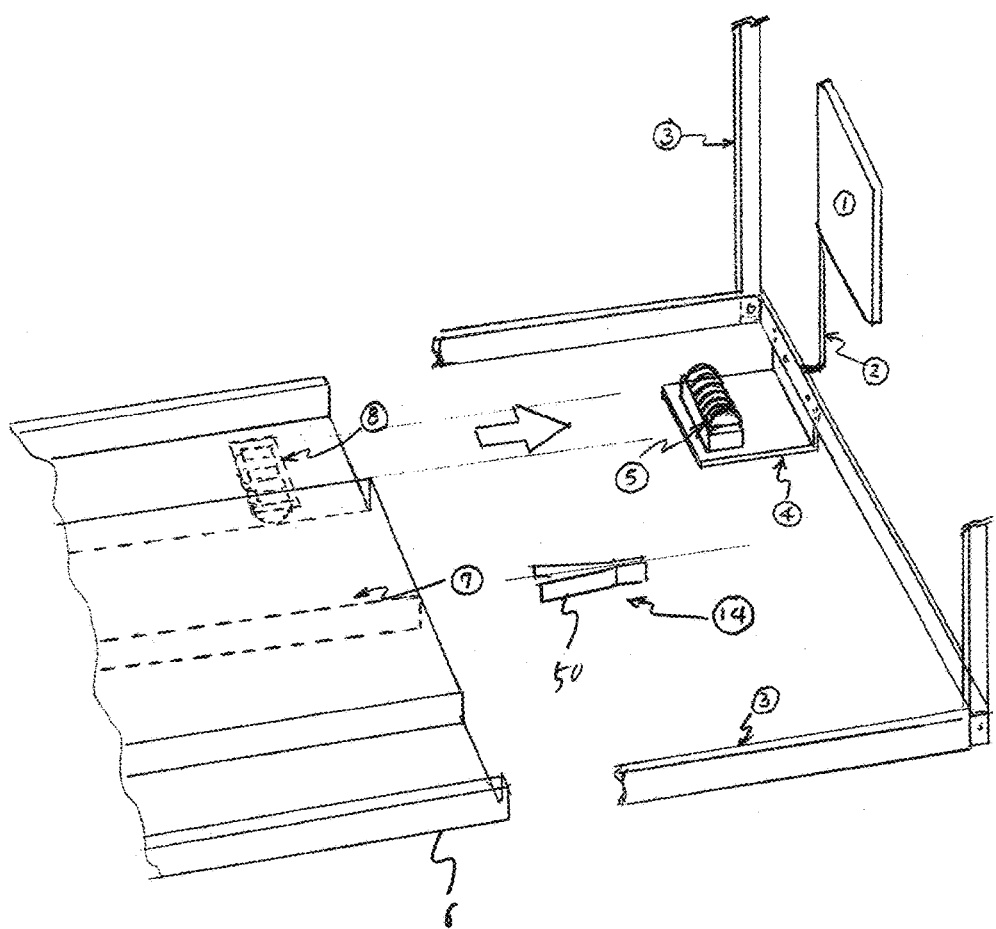
FIG. 1 is an exploded perspective view showing a first embodiment of a charging device according to the present invention.

Referring to FIG. 1, an electric power distributor 1 installed in a parking stall structure 3 provides electricity via a feed cable 2 to electric contacts 5 fixed on an electric contact bracket 4. To ensure precise positioning of the contacts, an elongated position guide 7 fixed to a pallet 6 is received and guided by a pallet position guide receiver 14, which has a tapered wall and fixed to the parking stall 3. Moving rollers (now shown) are provided between the guide and the receiver. As the pallet 6 is moved into the parking stall 3 and secured in parking state, electric contacts 8, which are installed on the pallet, abut the electric contacts 5 of the parking stall.

Figures 2, 3:
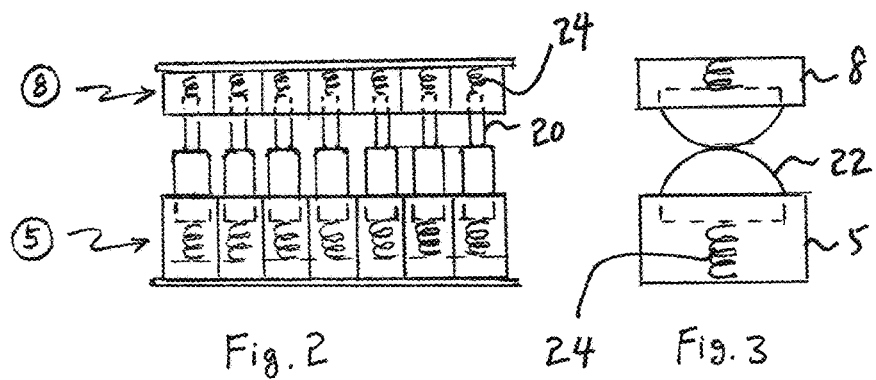
FIG. 2 is a front elevation view showing electric contacts of the charging device.
FIG. 3 is a side elevation view of the electric contacts.

Referring to FIGS. 2 and 3, a plurality of contact segments 20, 22 are loaded with springs 24. In this way, measures for dimensional tolerance for electrical contact when the pallet carrying an electric vehicle is secured in a designated slot in the parking stall structure. The plurality of spring loaded semi-circular contact segments are provided under the pallet either in longitudinal or transverse direction. The contacts carry electric current to a standard charging device for electric vehicle parked on the pallet. Corresponding contacts are provided on the parking stall structure. Carbon brushes or a buss bar may be used for the electric contact segments.

Figure 4:
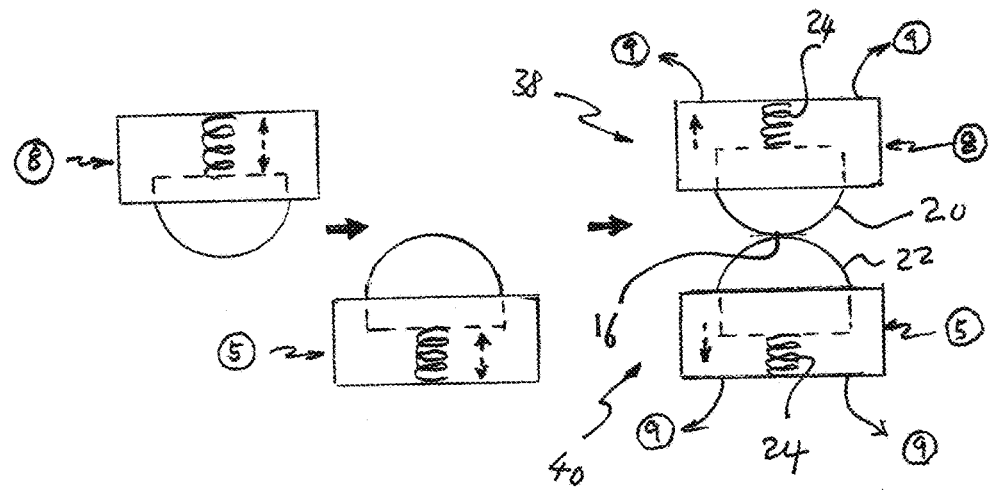
FIG. 4 is a schematic diagram showing how electric contact is established in the first embodiment.

Referring to FIG. 4, as the pallet is moved into the stall 3, the contact segments 20 of the pallet side physically contact the contact segments 22 of the stall side. The plural number of the contact segments and the pressure by the springs 24 ensure proper contact for electric current flowing supplied via wire connections 9.

Referring to FIGS. 5-10, a buss bar 12 is used as the electric contact for the parking stall, and an electrical contact 13 having opposing spring loaded contact segments 26 is used as the electric contact for the pallet. FIGS. 8 and 9 show two contacts 13 and two buss bars 12 are used for better electrical contact. FIG. 10 shows that the buss bar 12 is secured between the contact segments 26.

FIGS. 11 and 12 show a vehicle carrying pallet having a pallet mounted EV plug station 11 equipped on it. An electric plug 10 with a cord is extended from the station 11. The electric plug 10 comprises a universal SAE-J1772 EV plug. Referring to FIG. 12, the EV plug station 11 may be positioned on either side of the pallet to accommodate different kind of electric vehicles. Electric contacts 8 and 13 are for pallets that are moved longitudinally into the stall. For pallets that are moved transversely into the stall, electric contacts 8' and 13' are provided in line with the direction of the movement. The shape of the contact segments is semi-circular. The number of contact segments may vary with the electrical current requirements of the EV charging system. The contacts for the pallet side are provided under the pallet.

Figure 23:
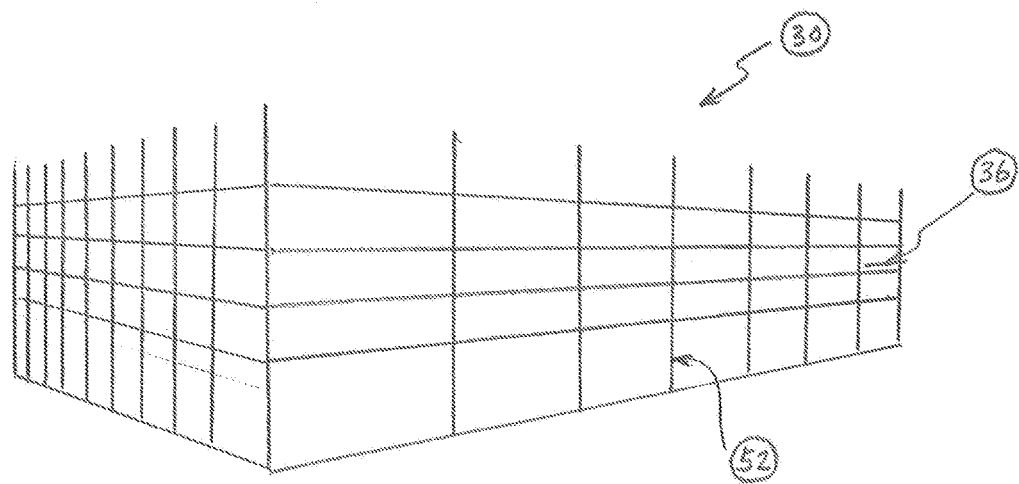
FIG. 23 is a perspective view showing the inside of a mechanized parking structure.
Figure 24:
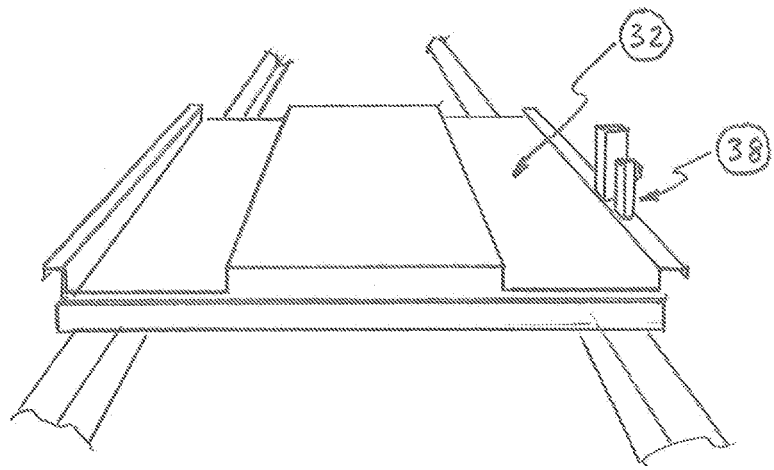
FIG. 24 is a perspective view showing a pallet.
Figure 25:
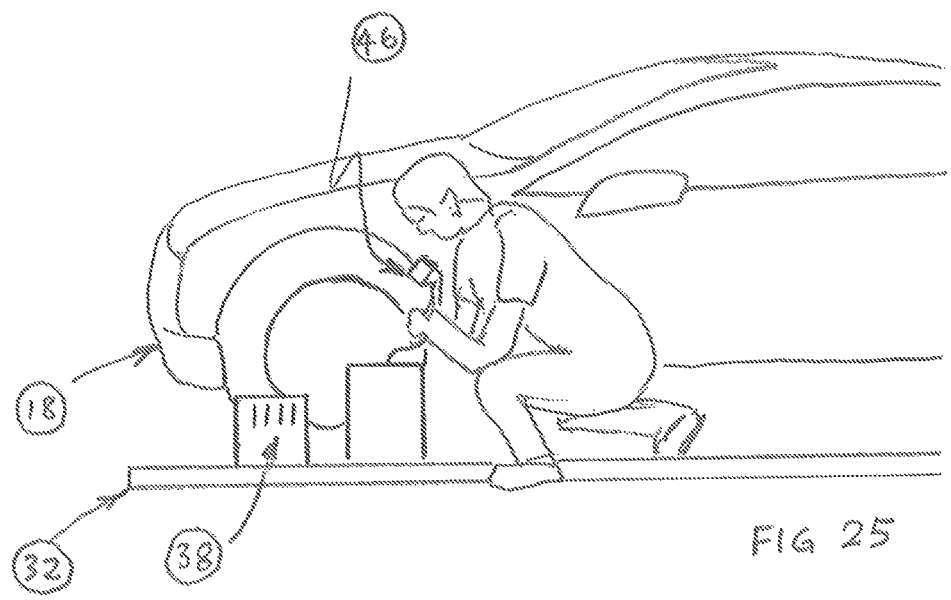
FIG. 25 is a perspective view showing that a driver is pulling the plug.
Figure 26:
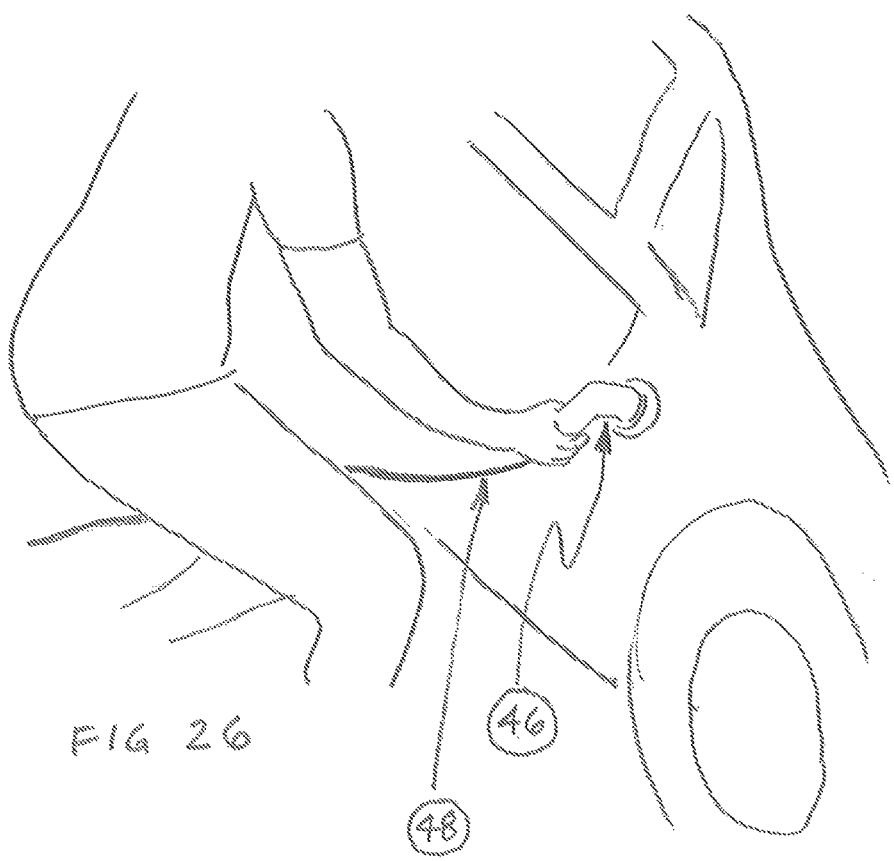
FIG. 26 is a perspective view showing that the driver is inserting the plug into the vehicle.
Figure 27:
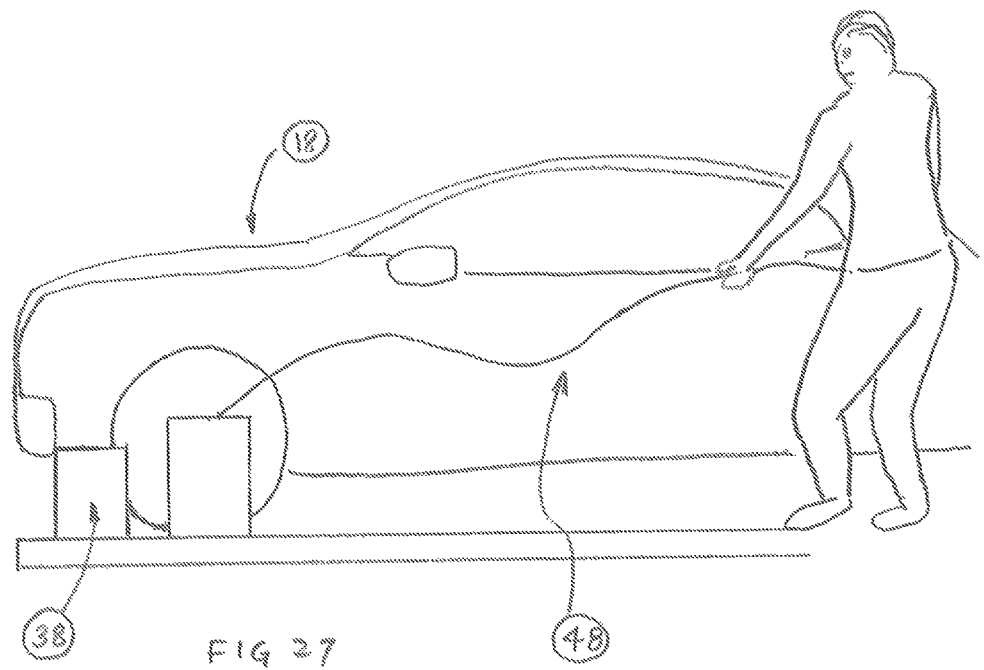
FIG. 27 is a perspective view showing that the driver is releasing the electric cord.
Figure 28:
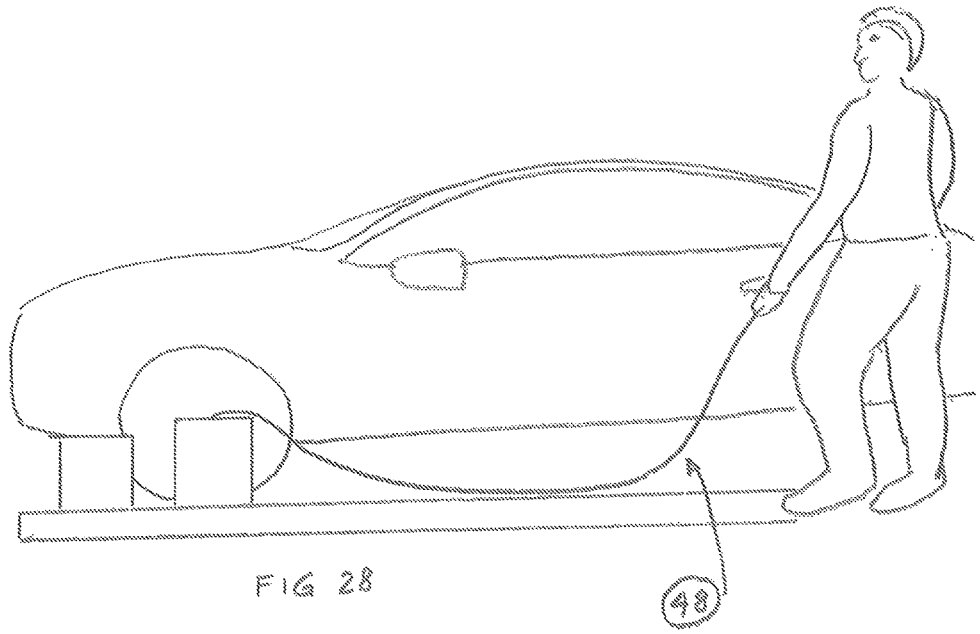
FIG. 28 is a perspective view shoeing that the electric cord is safely positioned within the width of the pallet.
Figure 29:
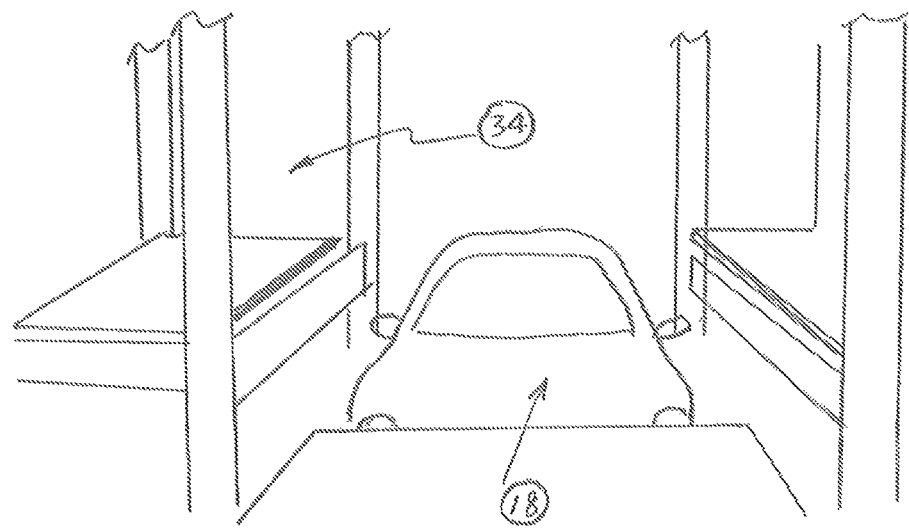
FIG. 29 is a perspective view showing that the vehicle is elevated to an upper floor.
Figure 30:
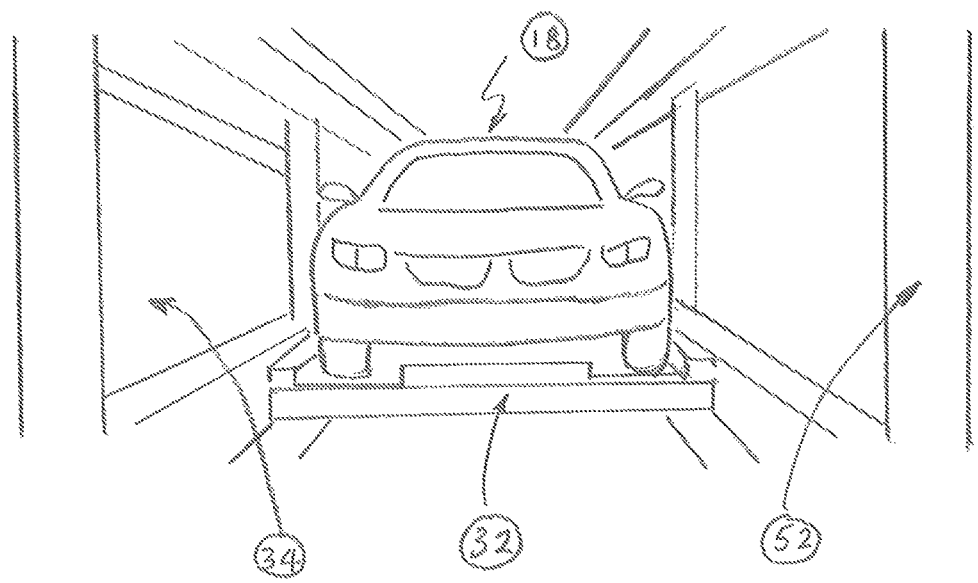
FIG. 30 is a perspective view showing that the vehicle is moved forward along a path.
Figure 81:
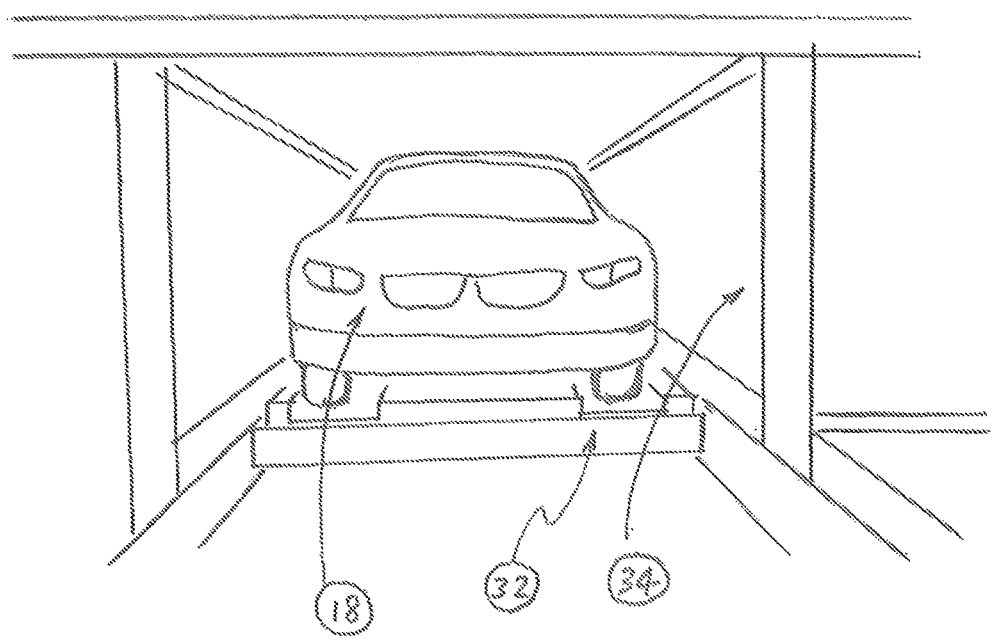
Figure 32:
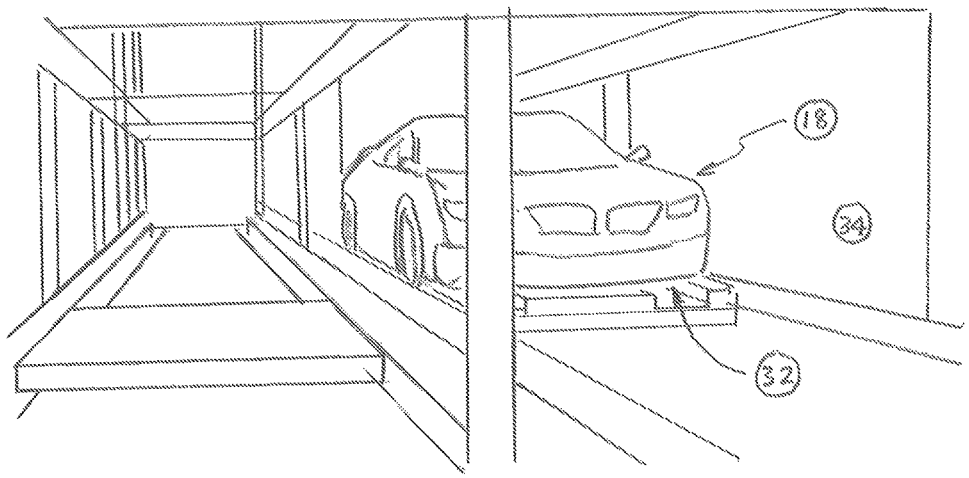
FIG. 32 is a perspective view showing that the vehicle is moving into the stall.

Referring FIGS. 23 and 24, a mechanized parking structure 30 comprises a plurality of vehicle carrying pallets 32, a plurality of parking stalls 34 in which the vehicle carrying pallets 32 are stored and a plurality of electric charging devices 36.

Figure 33:
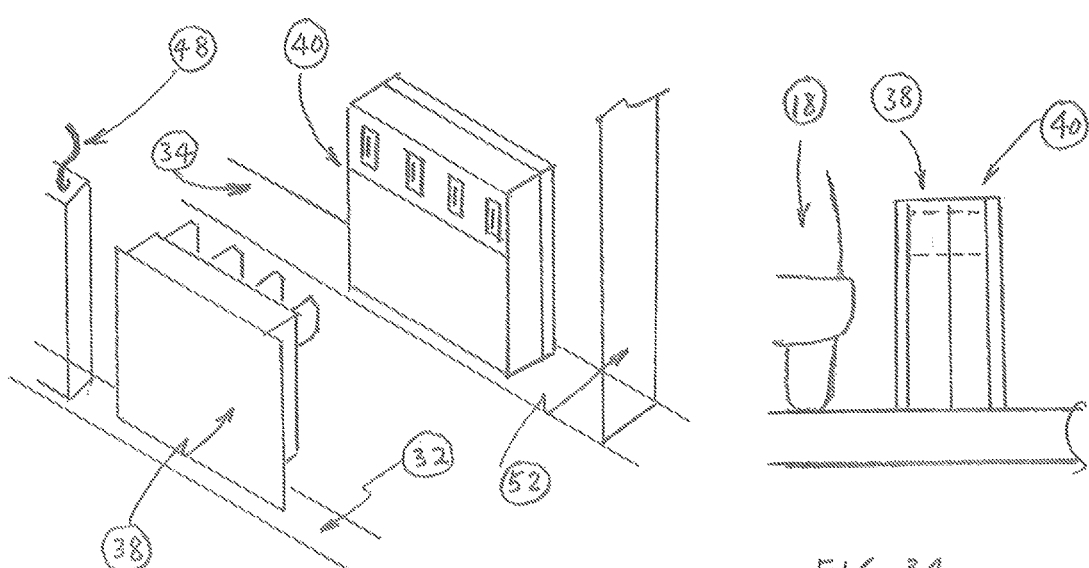
FIG. 33 is a perspective view showing that the pallet-side electric contact device is moved toward the stall-side electric contact device.
Figure 34:
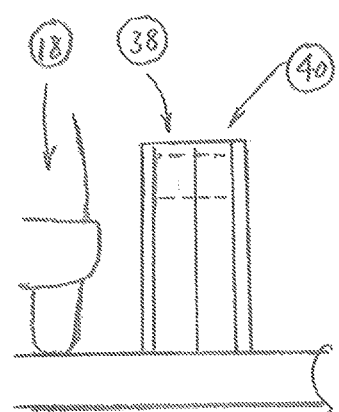
FIGS. 34 and 35 are perspective views showing that the two devices are engaged.
Figure 35:
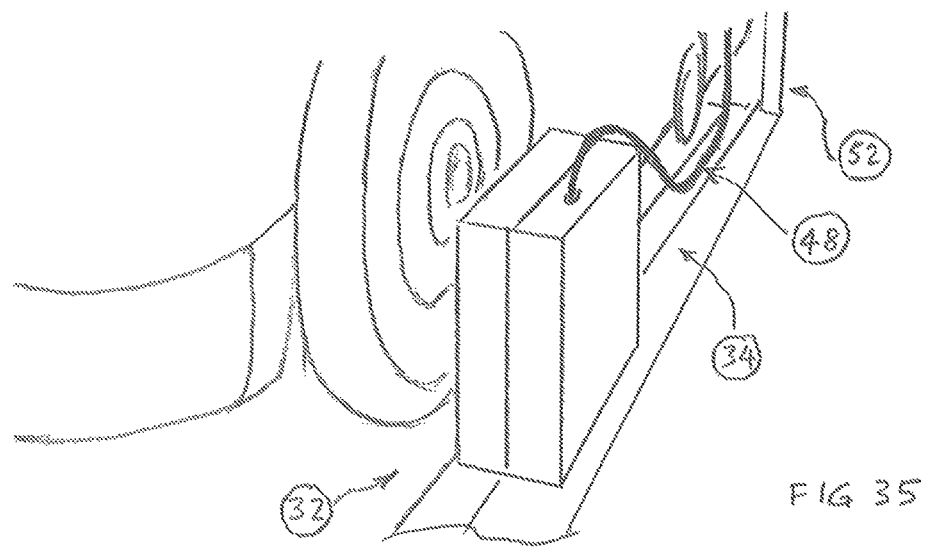

Referring to FIGS. 13-16, The electric charging device 36 comprises a pallet-side electric contact device 38, a stall-side electric contact device 40, wherein the stall-side electric contact device 40 engages with the pallet-side electric contact device 38 when the vehicle carrying pallet 32 is stored in the parking stall 34 whereby an electric circuit is established (refer to FIGS. 33 and 34). At least part of the vehicle carrying pallets 32 comprise the pallet-side electric contact device 38 and at least part of the parking stalls 34 comprise electric power supply 1 that is connected to the stall-side electric contact device 40. A plurality of physical contacts 16 are established between the pallet-side electric contact device 38 and the stall-side electric contact device 40 when the electric circuit is established (refer to FIGS. 4 and 10).

Referring to FIGS. 4, 10, 19 and 20, the pallet-side electric contact device 38 comprises a plurality of contact segments 42 and a plurality of springs 24 that are compressed by the contact segments 42; and/or the stall-side electric contact device 40 comprises a plurality of contact segments 44 and a plurality of springs 24 that are compressed by the contact segments 44.

Referring to FIGS. 1, 5, 21, 22 and 32-35, the physical contacts 16 are established by the movement of the vehicle carrying pallet 32 into the parking stall 34 and broken by the movement of the vehicle carrying pallet 32 out of the parking stall 34.

The pallet-side electric contact device 38 comprises a plurality of contact segments 42 that correspond to the contact segments 44 of the stall-side electric contact device 40, an electric plug 46 that is adapted to be plugged into an electric vehicle 18, and an electric cord 48 that electrically connects the electric plug and the contact segments (refer to FIGS. 13, 14, 17, 19, 20 and 25-28). Tension is applied to the electric cord 48 whereby the electric cord 48 is secured over the vehicle carrying pallet 32. Tension is provided by a spring that is connected to a spool around which the cord is wound (not shown).

Figure 5:
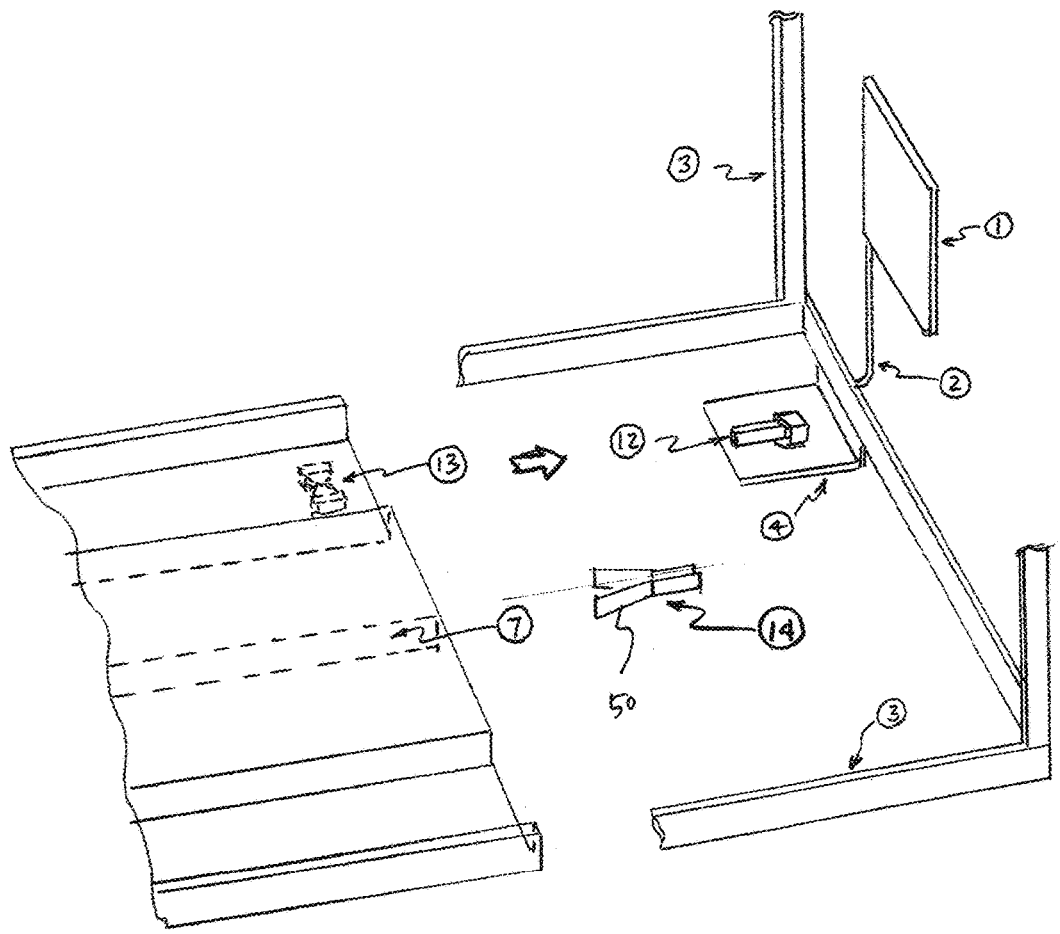
FIG. 5 is an exploded perspective view showing a second embodiment of a charging device according to the present invention.
Figure 17:
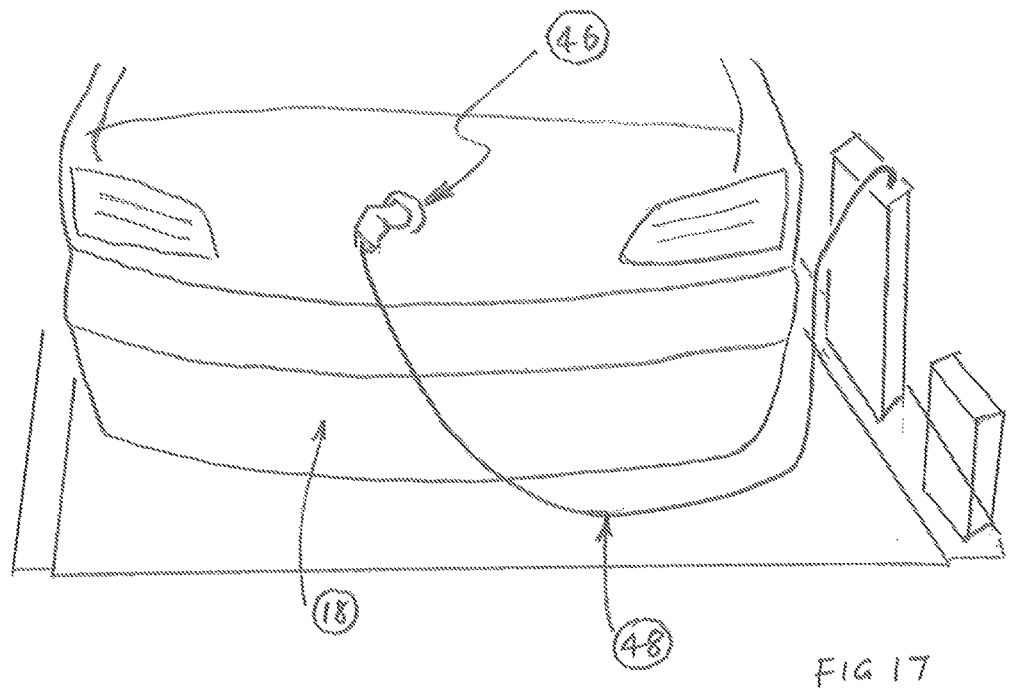
FIG. 17 is a perspective view showing that a plug is inserted into a connector of the electric vehicle.

Referring to FIGS. 1 and 5, the vehicle carrying pallet 32 comprises a position guide 7 and the parking stall 34 comprises a position guide receiver 14 with a tapered wall 50 that receives the position guide 14 whereby providing precise alignment of the contact segments 42 of the pallet-side electric contact device 38 and the contact segments 44 of the stall-side electric contact device 40.

Referring to FIGS. 1 and 5, the pallet-side electric contact device 38 is provided under the vehicle carrying pallet 32.

Figure 18:
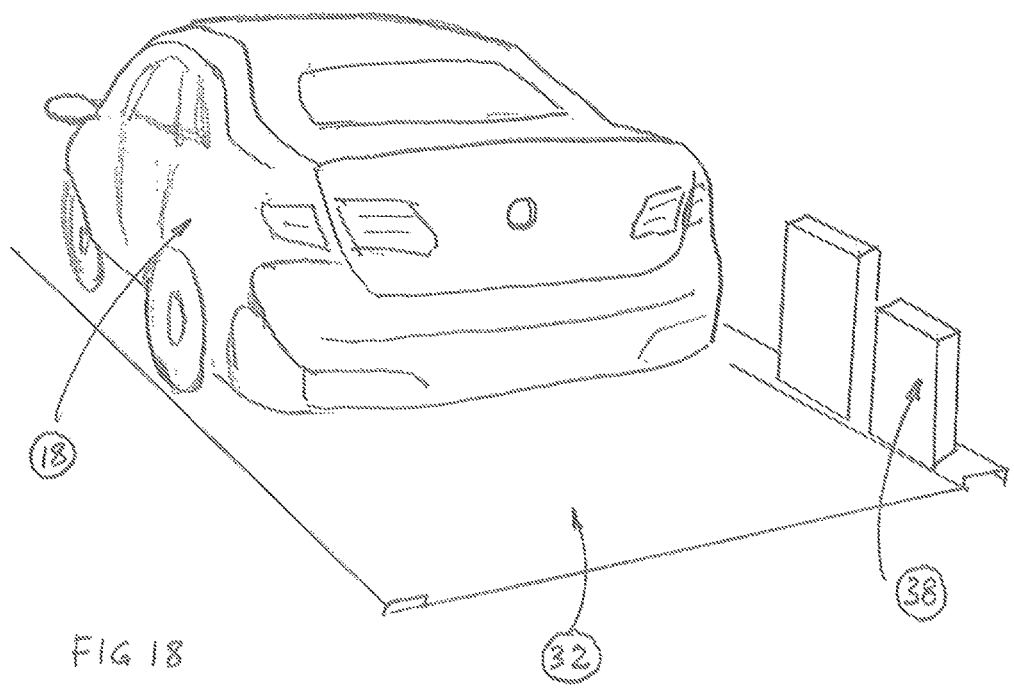
FIG. 18 is a perspective view showing the electric vehicle is moving onto the pallet on its designated position.
Figure 19:
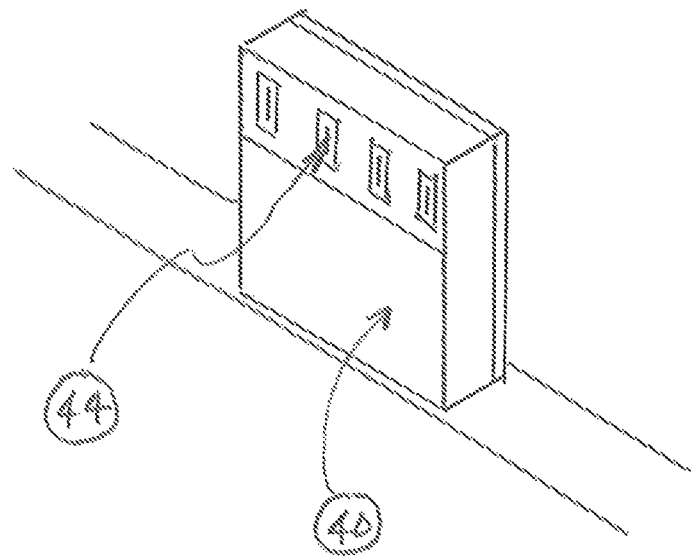
FIG. 19 is an enlarged perspective view showing the stall-side electric contact device.
Figure 20:
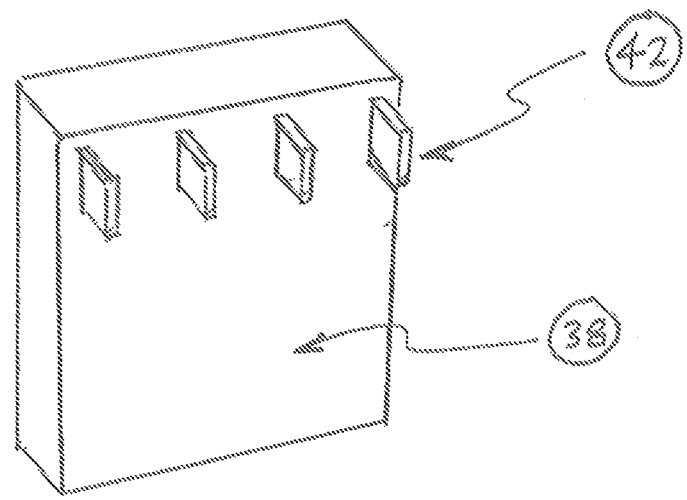
FIG. 20 is an enlarged perspective view showing the pallet-side electric contact device.
Figure 21:
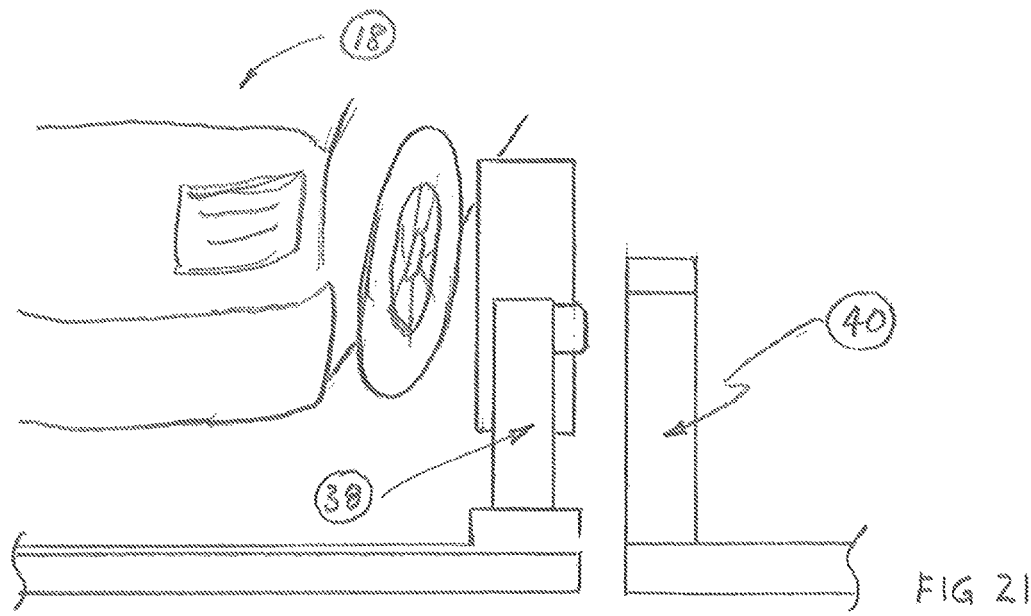
FIG. 21 is a perspective view showing that the two electric contact devices are close.
Figure 22:
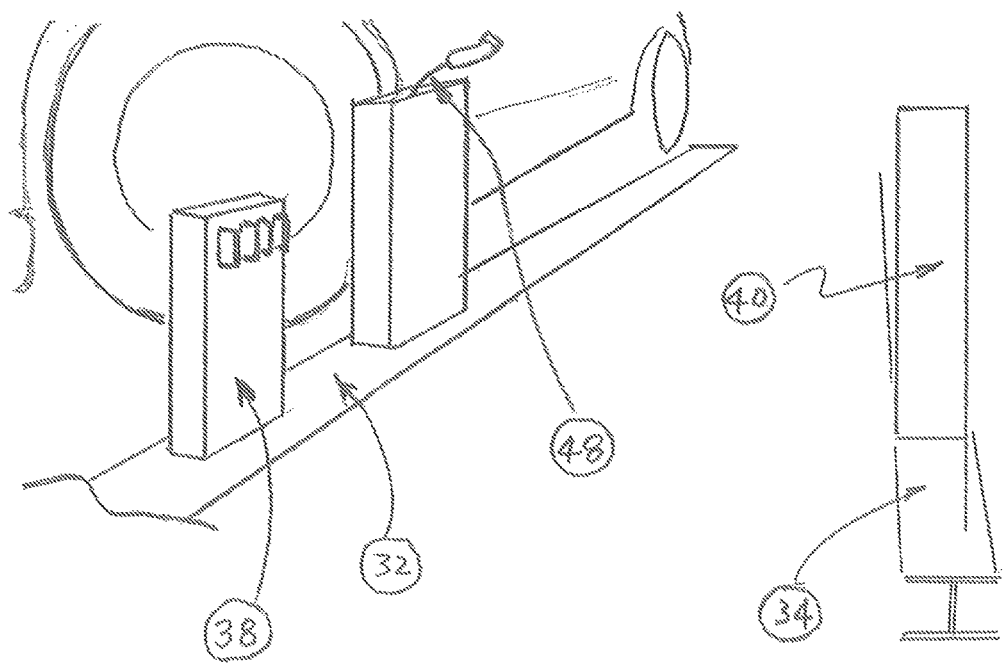
FIG. 22 is a perspective view showing that the two electric contact devices are spaced apart.

Referring to FIGS. 13 and 18, the pallet-side electric contact device 38 is provided at the side of the vehicle carrying pallet 32. In this way, the electric charging device 36 does riot interfere with the space required for the vehicle 18 on the vehicle carrying pallet 32.

Referring to FIGS. 23, 30, 33 and 35, the parking stall 34 comprises structural beams 52, wherein the stall-side electric contact device 40 is substantially positioned within the width of the structural beam 52. In this way, the electric charging device 36 does not interfere with the space required for the parking stall 34 within the mechanized parking structure 30.

Figure 36:
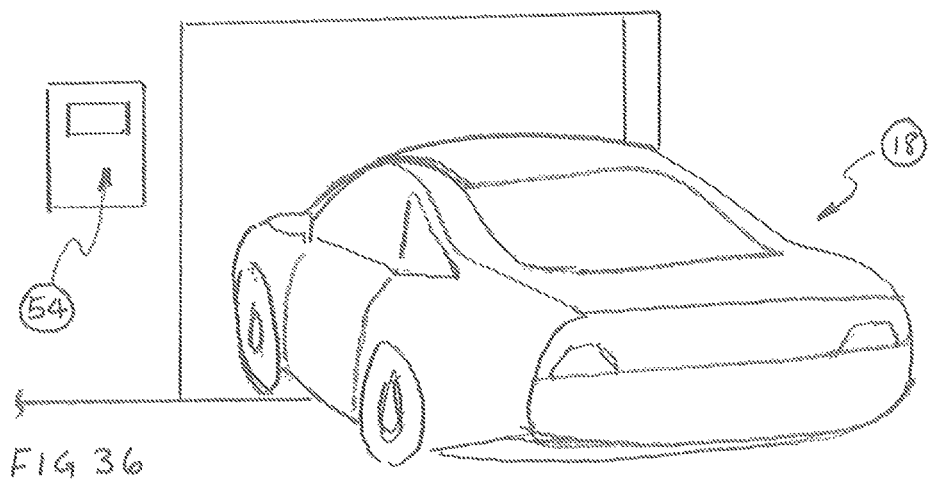
FIG. 36 is a perspective view showing a controller that controls charging of the electric vehicle in the parking structure.
Figure 37:
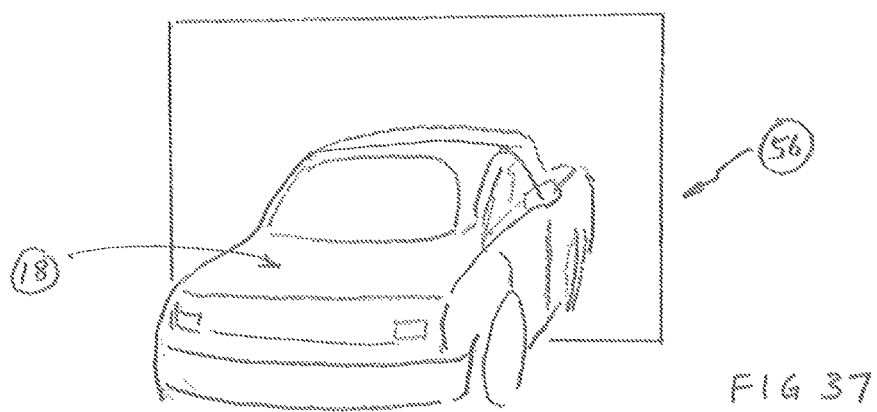
FIG. 37 is a perspective view showing a scanner that recognizes type of the vehicle.

Referring to FIGS. 36 and 37, the mechanized parking structure 30 further comprises a controller 54 that recognizes the type of a vehicle with an optical scanner 56 and calculates the amount of electricity charged to the vehicle 18 by measuring the amount of electricity flowing through the stall-side electric contact device 40.

Referring to FIGS. 18, 29-32, the electric vehicle 18 is moved on its position on the vehicle carrying pallet 32, and after plugging the charger, the electric vehicle 18 is moved to its designated parking stall 34 by the pallet moving mechanism of the mechanized parking structure 30.

Although the skin weft hair extension according to an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

The invention claimed is:

1. A mechanized parking structure comprises:
   i) a plurality of vehicle carrying pallets;
   ii) a plurality of parking stalls in which the vehicle carrying pallets are stored,
   iii) a pallet moving mechanism that moves the vehicle carrying pallet into a designated parking stall; and
   iv) a plurality of electric charging devices;
      wherein the electric charging device comprises:
      a) a pallet-side electric contact device;
      b) a stall-side electric contact device wherein the stall-side electric contact device engages with the pallet-side electric contact device when the vehicle carrying pallet is stored in the parking stall whereby electric circuit is established;
         wherein at least part of the vehicle carrying pallets comprise the pallet-side electric contact device and at least part of the parking stalls comprise electric power supply that is connected to the stall-side electric contact device;
         wherein a plurality of physical contacts are established between the pallet-side electric contact device and the stall side electric contact device thereby establishing the electric circuit;
         wherein the stall-side electric contact device comprises a plurality of contact segments;
         wherein the physical contacts are established by the movement of the vehicle carrying pallet into the designated parking stall and broken by the movement of the vehicle carrying pallet out of the designated parking stall; and
         wherein the pallet-side electric contact device comprises a plurality of contact segments that correspond to the plurality of the contact segments of the stall-side electric contact device, an electric plug that is adapted to be plugged into an electric vehicle, and an electric cord that electrically connects the plug and the plurality of the contact segments of the pallet side electric contact device.

2. The mechanized parking structure of claim 1, wherein tension is applied to the electric cord whereby the electric cord is secured over the vehicle carrying pallet.

3. The mechanized parking structure of claim 1, wherein the vehicle carrying pallet comprises a position guide and the parking stall comprises a position guide receiver with a tapered wall that receives the position guide whereby providing precise alignment of the contact segments of the pallet-side electric contact device and the contact segments of the stall-side electric contact device.

4. The mechanized parking structure of claim: 1, wherein the pallet-side electric contact device is provided under the vehicle carrying pallet.

5. The mechanized parking structure of claim 1, wherein the pallet-side electric contact device is provided at the side of the vehicle carrying pallet.

6. The mechanized parking structure of claim 1, wherein the parking stall comprises structural beams, wherein the stall-side electric contact device is substantially positioned within the width of the structural beam.

7. The mechanized parking structure of claim 1, further comprising a controller that recognizes the type of a vehicle with an optical scanner and calculates the amount of electricity charged to the vehicle by measuring the amount of electricity flowing through the stall-side electric contact device.

* * * * *